(12) United States Patent
Cohen et al.

(10) Patent No.: US 11,167,732 B1
(45) Date of Patent: Nov. 9, 2021

(54) HYDROGEN FUELING STATION WITH INTEGRATED AMMONIA CRACKING UNIT

(71) Applicant: Air Products and Chemicals, Inc., Allentown, PA (US)

(72) Inventors: Joseph P. Cohen, Bethlehem, PA (US); Simone L. Kothare, Slatington, PA (US); Anthony R. Kyvelos, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/124,594

(22) Filed: Dec. 17, 2020

(51) Int. Cl.
| | |
|---|---|
| *B60S 5/02* | (2006.01) |
| *F17C 5/06* | (2006.01) |
| *F17C 13/04* | (2006.01) |
| *F17C 13/12* | (2006.01) |
| *C01B 3/04* | (2006.01) |

(52) U.S. Cl.
CPC ............... *B60S 5/02* (2013.01); *C01B 3/047* (2013.01); *F17C 5/06* (2013.01); *F17C 13/04* (2013.01); *F17C 13/12* (2013.01); *F17C 2205/0134* (2013.01); *F17C 2205/0323* (2013.01); *F17C 2221/012* (2013.01); *F17C 2221/014* (2013.01); *F17C 2225/0123* (2013.01); *F17C 2225/035* (2013.01); *F17C 2227/0157* (2013.01); *F17C 2227/043* (2013.01); *F17C 2227/044* (2013.01); *F17C 2250/01* (2013.01); *F17C 2260/042* (2013.01); *F17C 2265/063* (2013.01); *F17C 2270/0139* (2013.01)

(58) Field of Classification Search
CPC .. B60S 5/02; F17C 13/04; F17C 13/12; F17C 5/06; F17C 2221/014; F17C 2221/012; F17C 2205/0323; F17C 2205/0134; F17C 2225/0123; F17C 2225/035; F17C 2227/0157; F17C 2227/043; F17C 2227/044; F17C 2250/01; F17C 2265/063; F17C 2270/0139; F17C 2260/042; C01B 3/047
See application file for complete search history.

(56) References Cited

U.S. PATENT DOCUMENTS 5,582,029 A * 12/1996 Occhialini .............. C21B 13/14
62/636
7,763,087 B2 * 7/2010 Hajiaghajani ........ G05B 23/021
48/197 R (Continued)

*Primary Examiner* — Nicolas A Arnett
(74) *Attorney, Agent, or Firm* — Matthew R. Weaver

(57) ABSTRACT

A system comprising an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank, wherein nitrogen from the ammonia cracking unit is used in e.g.: the operation of one or more of the GOVs; for blanketing one or more of said hydrogen compressing units; for blanketing and/or purging one or more of the dispensing units; for drying one or more of the nozzles between uses to prevent nozzle freeze on.

13 Claims, 1 Drawing Sheet

(56) References Cited

U.S. PATENT DOCUMENTS

| | | | | |
|---|---|---|---|---|
| 7,811,529 | B2* | 10/2010 | Powell | C01B 3/047 |
| | | | | 422/236 |
| 8,360,112 | B2* | 1/2013 | Allidieres | F17C 5/007 |
| | | | | 141/4 |
| 8,961,923 | B2* | 2/2015 | Grannell | C01B 3/06 |
| | | | | 423/648.1 |
| 10,065,170 | B2* | 9/2018 | Kambara | H01M 8/0606 |
| 10,240,721 | B2* | 3/2019 | Dawson | F17C 5/06 |
| 10,634,283 | B2* | 4/2020 | Nagura | F17C 5/06 |
| 10,830,125 | B2* | 11/2020 | Pomar | B01D 53/24 |
| 10,840,519 | B2* | 11/2020 | Akashi | H02J 3/387 |
| 2004/0163731 | A1 | 8/2004 | Eichelberger et al. | |
| 2009/0304574 | A1 | 12/2009 | Ravikumar | |
| 2011/0008694 | A1* | 1/2011 | Tange | F02B 43/10 |
| | | | | 429/423 |
| 2012/0040261 | A1* | 2/2012 | Nakanishi | B01J 21/04 |
| | | | | 429/416 |

* cited by examiner

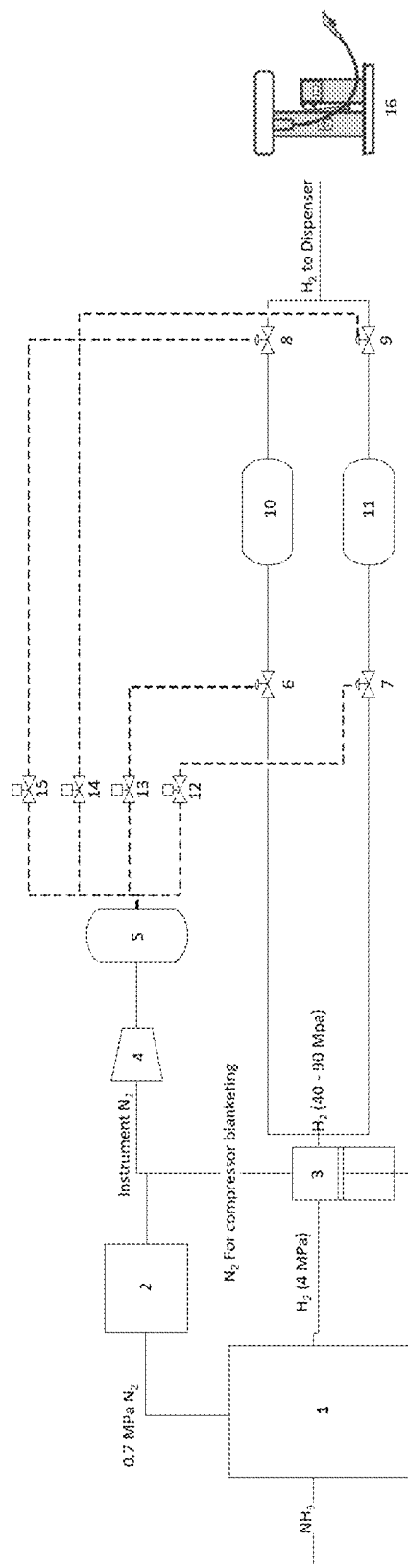

HYDROGEN FUELING STATION WITH INTEGRATED AMMONIA CRACKING UNIT

FIELD

The present invention relates to a system comprising a hydrogen fueling station with an integrated ammonia cracking unit, and to a process for fueling of vehicle tanks using such a system.

BACKGROUND

Several configurations and systems for fueling of hydrogen-driven vehicles in hydrogen fueling stations are known in the art. For example, US 2004/163731 (A1) discloses a self-contained mobile gas fueling station.

Hydrogen can be delivered to such stations either by supplying them with compressed or even liquid hydrogen, or by means of a chemical "carrier" comprising hydrogen from which hydrogen is split off at or close to the station.

For example, US 2009/304574 (A1) describes configurations and methods in which a hydrogen fueling station receives liquid ammonia and in which hydrogen is produced from said ammonia by catalytic cracking. The so produced hydrogen is then compressed and fed to a filling dock. Usually, nitrogen also produced in the ammonia cracking unit is purged into air as a waste gas.

It has been found that there is still a need to further improve such systems using ammonia as a carrier to deliver hydrogen to hydrogen fueling stations.

SUMMARY

Accordingly, the present invention aims at providing a system comprising a hydrogen fueling station and an ammonia cracking unit which makes an increased use of synergistic effects between the units and hence provides a higher degree of integration of the entire system.

The invention is based on the finding that this aim can be achieved if the nitrogen from the ammonia cracking unit is further used in the operation of the hydrogen fueling station.

Several preferred aspects of the present invention are outlined below.

Aspect 1. A system comprising an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank,
  wherein nitrogen from the ammonia cracking unit is used in one or more of the following:
  a) the operation of one or more of the GOVs,
  b) for blanketing one or more of said hydrogen compressing units,
  c) for blanketing and/or purging one or more of said dispensing units,
  d) for drying one or more of said nozzles between uses to prevent nozzle freeze on.

Aspect 2. System according to Aspect 1 wherein the moisture content of the nitrogen which is obtained from the ammonia cracking unit is such that the dew point is −20° C. or lower.

Aspect 3. System according to Aspects 1 or 2 wherein the fueling station comprises one or more hydrogen storage tanks and filling of one or more of said hydrogen storage tanks is controlled by a fill-GOV operated using nitrogen from the ammonia cracking unit.

Aspect 4. System according to any one of Aspects 1 to 3 wherein the flow of hydrogen to one or more of said dispensing units is controlled by a dispensing-GOV operated using nitrogen from the ammonia cracking unit.

Aspect 5. System according to any one of Aspects 1 to 4 wherein the system comprises one or more compressing units and the flow of hydrogen to one or more of said compressing units is controlled by a compressing-GOV operated using nitrogen from the ammonia cracking unit.

Aspect 6. System according to any one of Aspects 1 to 5 wherein one or more of said GOVs is actuated by an electronic controlled valve (ECV).

Aspect 7. System according to any one of Aspects 1 to 6 wherein the nitrogen which is used in the operation of one or more of the GOVs is at a pressure of 0.4 to 0.9 M Pa.

Aspect 8. System according to any one of Aspects 1 to 7 which comprises an instrument nitrogen surge container in which nitrogen from the ammonia cracking unit is stored before being used in the operation of said one or more GOVs.

Aspect 9. System according to any one Aspects 1 to 8 wherein residual ammonia and/or hydrogen is removed from the nitrogen before it is used in the operation of said one or more GOVs.

Aspect 10. System according to any one of Aspects 1 to 9 wherein nitrogen from the ammonia cracking unit is used for blanketing one or more of said hydrogen compressing units with nitrogen with a flow rate of 50 to 450 SCFH (1.4 to 12.6 $Nm^3/hr$) per compressing unit Aspect 11. System according to any one of Aspects 1 to 10 wherein hydrogen is compressed upstream of the ammonia cracking unit.

Aspect 12. System according to Aspect 11 wherein hydrogen is compressed to a pressure of 30 MPa or more.

Aspect 13. A process for fueling of vehicle tanks with hydrogen using a system according to any one of Aspects 1 to 12.

The system of the invention makes use of not only the hydrogen but also of the nitrogen generated in the ammonia cracking unit and hence serves to better integrate the system and to reduce operating costs.

BRIEF DESCRIPTION OF THE DRAWINGS

The present invention will hereinafter be described in conjunction with the appended FIGURE wherein like numerals denote like elements:

FIG. 1 shows an embodiment of the integrated system of the invention.

DETAILED DESCRIPTION

In a first embodiment, the system of the invention comprises an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank, wherein nitrogen from the ammonia cracking unit is used in the operation of one or more of the GOVs.

In a second embodiment, the system of the invention comprises an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank, wherein nitrogen from the ammonia cracking unit is used for blanketing one or more of said hydrogen compressing units.

In a third embodiment, the system of the invention comprises an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank, wherein nitrogen from the ammonia cracking unit is used for blanketing and/or purging one or more of said dispensing units.

In a fourth embodiment, the system of the invention comprises an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank, wherein nitrogen from the ammonia cracking unit is used for drying one or more of said nozzles between uses to prevent nozzle freeze on.

In all embodiments as described herein, the system of the invention offers the advantageous synergy that not only hydrogen but also nitrogen generated in the ammonia cracking unit is further used within the system. This lowers the operating costs of the system as, for example, for blanketing compressors and/or for operating GOVs of the system no external nitrogen source is needed.

It is a further advantage of the invention that nitrogen obtained by ammonia cracking has a moisture content which is very low, which makes it especially suitable in the operation of GOVs without the need to reduce its moisture content. Usually, air compressors for obtaining instrumentation gas are used which, however, frequently entrain water into the instrumentation gas stream which can damage valves.

Preferably, the system of the invention comprises at least two of nitrogen use options a) to d), such as e.g. a) and b), a) and c), a) and d), b) and c), or c) and d), further preferred at least 3 of nitrogen use options, such as a), b) and c), a), b) and d), or b), c) and d) and still further preferred all nitrogen use options a) to d).

For example, in the system of the invention nitrogen from the ammonia cracking unit can be used at least in the operation of one or more of the GOVs and for blanketing one or more of said hydrogen compressing units.

The moisture content of the nitrogen which is obtained from the ammonia cracking unit is such that the dew point is −20° C. or lower, more preferably is such that the dew point is −30° C. or lower.

The fueling station preferably further comprises one or more hydrogen storage tanks and filling of one or more of said hydrogen storage tanks is controlled by a fill-GOV using nitrogen from the ammonia cracking unit.

Furthermore, the fueling station preferably comprises one or more dispensing units and the flow of hydrogen to one or more of said dispensing units is controlled by a dispensing-GOV operated using nitrogen from the ammonia cracking unit.

Still further, the system comprises one or more compressing units and the flow of hydrogen to one or more of said compressing units is controlled by a compressing-GOV operated using nitrogen from the ammonia cracking unit.

Preferably, one or more of the GOVs used in the system of the invention, more preferably all of the GOVs, is/are actuated by electronic controlled valves (ECVs).

As GOVs, sometimes also designated as pneumatically actuated valves, valves from companies such as Tescom or Swagelok can be used, for example the VAC product line from Tescom or actuated H83 ball valves from Swagelok.

The nitrogen which is used in the operation of one or more of the GOVs is preferably at a pressure of 0.4 to 0.9 MPa, such as at a pressure of 0.55 to 0.7 MPa.

Preferably, nitrogen is preferably withdrawn from the ammonia cracking unit at a pressure of 0.4 to 0.9 MPa, such as at a pressure of 0.55 to 0.7 MPa.

However, if the nitrogen withdrawn from the ammonia cracking unit has a different pressure its pressure may have to be adapted to fall into the above given ranges. For example, where nitrogen withdrawn from the ammonia cracking unit has a pressure of 0.1 MPa, the pressure will have to be increased to fall within the desired range as described above.

Preferably, the system comprises an instrument nitrogen surge container in which nitrogen from the ammonia cracking unit is stored before being used in the operation of said one or more GOVs.

The nitrogen surge container is used to match the production rate to the usage rate. Nitrogen production in the ammonia cracking unit will usually be at a more or less constant rate.

For example, nitrogen production rate may be from 150 to 6,000 kg/hr, such as 300 to 4,000 kg/hr for dispensing hydrogen to vehicles in the 2500-7500 kg/day capacity range (for 8-24 hours of dispensing/day). If also power is to be generated the nitrogen production rate will be higher, such as e.g. from 300 to 1,000 kg/hr, or 600 kg/hr and higher.

The nitrogen usage rate will vary from zero when the valves are not actuating to more than 10 sl/second as the valve are actuating. Nitrogen will be withdrawn from the nitrogen surge tank at the appropriate usage rate.

Where necessary, residual ammonia and/or hydrogen is removed from the nitrogen before it is used in the operation in one or more of nitrogen use options a) to d).

Where nitrogen from the ammonia cracking unit is used for blanketing one or more of said hydrogen compressing units (nitrogen use option b)), usually nitrogen with a flow rate of 50 to 450 SCFH (1.4 to 12.6 Nm$^3$/hr), such as 100 to 300 SCFH (2.8 to 8.4 Nm$^3$/hr) per compressing unit.

Nitrogen for blanketing may be injected into the area above the oil in the crankcase of the compressing unit(s) to prevent hydrogen that leaks past the sealing rings from creating a flammable atmosphere by displacing the oxygen in the crankcase. A typical flow rate for this nitrogen stream is 3.5 Nm$^3$/hr.

Nitrogen for blanketing may also be injected into the distance piece(s) between the compressor(s) frame and the cylinder to prevent hydrogen that leaks past the sealing rings from creating a flammable atmosphere in the distance piece by displacing the oxygen. A typical flow rate for this nitrogen here is 0.26 Nm$^3$/hr per distance piece. Accordingly, a compressor with four distance pieces will use 1.2 Nm$^3$/hr.

A further use for the blanketing nitrogen may in the pressure packing area of the compressing unit(s). In this area, nitrogen is used as a pressurized buffer to keep the hydrogen from leaking past the sealing rings. Each packing uses 0.29 Nm$^3$/hr typically, so a compressor with four packings will use 1.16 Nm$^3$/hr.

The nitrogen injection for blanketing may be used both while the compressing unit(s) is/are running, and while the compressing unit(s) is/are idle.

Hydrogen from the ammonia cracking unit is compressed upstream of the ammonia cracking unit, which preferably is done up to a pressure of 30 MPa or more. Hydrogen is pressured up to 40 MPa or more for H35 fueling, or 90 MPa or more for H70 fueling.

The invention further relates to a process for fueling of vehicle tanks with hydrogen using a system in any one of the above described embodiments.

EXAMPLE

FIG. 1 shows an embodiment of the system and process of the present invention in which an ammonia cracking unit 1 is used to crack ammonia into hydrogen and nitrogen. Nitrogen from the ammonia cracking unit 1 is used both in the operation of the GOVs 6, 7, 8, 9 and for blanketing the hydrogen compressing unit 3.

Ammonia is fed to the ammonia cracking unit 1, preferably from a green ammonia source. The ammonia cracking unit 1 splits the NH$_3$ into N$_2$ and H$_2$. The cracking unit 1 may operate in the 5-40 barg pressure range, most commonly in the 7-20 barg range.

Nitrogen from the ammonia cracking unit 1 leaves the device usually at about 0.7 MPa. After optional cleanup to remove residual ammonia and/or hydrogen in nitrogen cleaning unit 2, the nitrogen is partly led to a nitrogen surge container 5 for further use in the operation of the GOVs 6, 7, 8, 9 and partly directed to the hydrogen compressor 3 for blanketing.

The nitrogen directed to the nitrogen surge container 5 may optionally be compressed in nitrogen compressor 4 to be at a pressure of 0.55 to 0.7 MPa for storage.

For blanketing the compressor 3, nitrogen is injected into the area above the oil in the crankcase to prevent hydrogen that leaks past the sealing rings from creating a flammable atmosphere by displacing the oxygen in the crankcase. A typical flow rate for this nitrogen stream is 3.5 Nm$^3$/hr. Nitrogen is also injected into the distance piece(s) between the compressor frame and the cylinder to prevent hydrogen that leaks past the sealing rings from creating a flammable atmosphere in the distance piece by displacing the oxygen. A typical flow rate for this nitrogen here is 0.26 Nm$^3$/hr per distance piece. A compressor with four distance pieces will use 1.2 Nm$^3$/hr.

A further use for the nitrogen is in the pressure packing area of the compressor. In this area, nitrogen is used as a pressurized buffer to keep the hydrogen from leaking past the sealing rings. Each packing uses 0.29 Nm$^3$/hr typically, so a compressor with four packings will use 1.16 Nm$^3$/hr. The nitrogen injection is used both while the compressor is running, and while the compressor is idle.

Fill-GOVs 6, 7 are used to select which hydrogen storage bank of the fueling station receives the high pressure hydrogen. The fill-GOVs 6, 7, as well as any other GOVs in the system such as the dispensing-GOVs 8, 9 or compressor-GOVs (not shown), are operated using nitrogen from the ammonia cracking unit 1 and are actuated when the appropriate solenoid valve (ECV) 12, 13, 14, 15 opens. When a vehicle is ready to be filled, the appropriate cascade valve 8, 9 will open using N$_2$ from the nitrogen surge container, allowing H$_2$ from the storage tank 10, 11 to flow to the H$_2$ dispenser 16, and ultimately to the vehicle tank (not shown). Cascading is well known to the skilled person and is described, for example, in U.S. Pat. No. 8,899,278, starting in col. 1, line 17.

The H$_2$ from the ammonia cracking unit 1 is submitted to one or more compression stages in one or more compressors, such as the reciprocating H$_2$ compressor 3 shown in FIG. 1, to pressure it up to 40 MPa or more for H35 fueling, or 90 MPa or more for H70 fueling. The compressed hydrogen is then directed to one of the hydrogen storage banks 10, 11 controlled by the fill-GOVs 6, 7 as described above.

The invention claimed is:

1. A system comprising an ammonia cracking unit in which ammonia is split into hydrogen and nitrogen and a hydrogen fueling station for fueling of vehicle tanks with hydrogen from the ammonia cracking unit which comprises gas operated valves (GOVs), one or more hydrogen compressing units wherein the hydrogen from the ammonia cracking unit is compressed, and one or more dispensing units for dispensing the compressed hydrogen to vehicle tanks which each comprise a nozzle through which the hydrogen is passed to the vehicle tank,
   wherein nitrogen from the ammonia cracking unit is used in one or more of the following:
   a) the operation of one or more of the GOVs,
   b) for blanketing one or more of said hydrogen compressing units,
   c) for blanketing and/or purging one or more of said dispensing units,
   d) for drying one or more of said nozzles between uses to prevent nozzle freeze on.

2. System according to claim 1 wherein the moisture content of the nitrogen which is obtained from the ammonia cracking unit is such that the dew point is −20° C. or lower.

3. System according to claim 1 wherein the fueling station comprises one or more hydrogen storage tanks and filling of one or more of said hydrogen storage tanks is controlled by a fill-GOV operated using nitrogen from the ammonia cracking unit.

4. System according to claim 1 wherein the flow of hydrogen to one or more of said dispensing units is controlled by a dispensing-GOV operated using nitrogen from the ammonia cracking unit.

5. System according to claim 1 wherein the system comprises one or more compressing units and the flow of hydrogen to one or more of said compressing units is controlled by a compressing-GOV operated using nitrogen from the ammonia cracking unit.

6. System according to claim 1 wherein one or more of said GOVs is actuated by an electronic controlled valve (ECV).

7. System according to claim 1 wherein the nitrogen which is used in the operation of one or more of the GOVs is at a pressure of 0.4 to 0.9 MPa.

8. System according to claim 1 which comprises an instrument nitrogen surge container in which nitrogen from the ammonia cracking unit is stored before being used in the operation of said one or more GOVs.

9. System according to claim 1 wherein residual ammonia and/or hydrogen is removed from the nitrogen before it is used in the operation of said one or more GOVs.

10. System according to claim 1 wherein nitrogen from the ammonia cracking unit is used for blanketing one or more of said hydrogen compressing units with nitrogen with a flow rate of 50 to 450 SCFH (1.4 to 12.6 $Nm^3$/hr) per compressing unit.

11. System according to claim 1 wherein hydrogen is compressed upstream of the ammonia cracking unit.

12. System according to claim 11 wherein hydrogen is compressed to a pressure of 30 MPa or more.

13. A process for fueling of vehicle tanks with hydrogen using a system according to claim 1.

\* \* \* \* \*